US012654583B2

(12) United States Patent (10) Patent No.: US 12,654,583 B2
Hashimoto et al. (45) Date of Patent: Jun. 16, 2026

(54) POWER SUPPLY CONTROL DEVICE

(71) Applicant: TOYOTA JIDOSHA KABUSHIKI KAISHA, Toyota (JP)

(72) Inventors: Toshiya Hashimoto, Miyoshi (JP); Masato Maemura, Nisshin (JP); Ryosuke Ikemura, Susono (JP); Shogo Tsuge, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 171 days.

(21) Appl. No.: 18/631,116

(22) Filed: Apr. 10, 2024

(65) Prior Publication Data

US 2024/0399916 A1      Dec. 5, 2024

(30) Foreign Application Priority Data

Jun. 2, 2023    (JP) ................................. 2023-091925

(51) Int. Cl.
B60L 53/66 (2019.01)
B60W 40/04 (2006.01)
B60W 40/105 (2012.01)

(52) U.S. Cl.
CPC ............. B60L 53/66 (2019.02); B60W 40/04 (2013.01); B60W 40/105 (2013.01)

(58) Field of Classification Search
CPC .......... B60L 53/66; B60L 53/63; B60L 53/12; B60L 53/38; B60L 53/60; B60W 40/04; B60W 40/105
See application file for complete search history.

(56) References Cited

U.S. PATENT DOCUMENTS

2022/0135034 A1* 5/2022 Ito ........................... G08G 1/087
                                                                701/70
2023/0021364 A1* 1/2023 Hirano .................... B60L 53/12

FOREIGN PATENT DOCUMENTS

CN        114801826 A  *  7/2022  .............. B60L 53/60
JP        H11-008904 A     1/1999
JP        2015121881 A  *  7/2015
JP        2021-083143 A    5/2021
JP        2022069279 A  *  5/2022
JP        2022187257 A  * 12/2022
JP        2023017339 A  *  2/2023  .............. B60L 53/68
JP        2023067681 A  *  5/2023
WO        2013136518 A1    9/2013

* cited by examiner

*Primary Examiner* — Mary Cheung
(74) *Attorney, Agent, or Firm* — Oliff PLC

(57) ABSTRACT

The power supply control device according to the present disclosure is provided on a road side, and is a power supply control device that controls a power supply lane that supplies power to a vehicle, and includes a processor, wherein when a power shortage occurs in a power supply area by the power supply lane, the processor acquires travel state information of the vehicle in a plurality of power supply lanes managed by the power supply control device, and sets a priority level for power supply to each power supply lane based on the travel state information.

3 Claims, 4 Drawing Sheets

POWER SUPPLY CONTROL DEVICE

CROSS-REFERENCE TO RELATED APPLICATION

This application claims priority to Japanese Patent Application No. 2023-091925 filed on Jun. 2, 2023, incorporated herein by reference in its entirety.

BACKGROUND

1. Technical Field

The present disclosure relates to power supply control devices.

2. Description of Related Art

Japanese Unexamined Patent Application Publication No. 2021-83143 (JP 2021-83143 A) discloses a technique for controlling power transmission between a power transmission device provided on a road and a vehicle traveling on the road. In JP 2021-83143 A, the control device acquires regenerative power generated in the vehicle, identifies an upper limit value of electric power a battery of the vehicle can receive in addition to the regenerative power based on the regenerative power and the maximum charging power of the battery, and reduces electric power transmitted from the power transmission device to the vehicle to less than the upper limit value. The control device acquires thus reduces reception of excessive electric power.

SUMMARY

However, merely controlling the amount of electric power to be received by the vehicle may not be enough to stabilize the overall electric power balance in the power transmission system that includes a power supply lane in which the vehicle travels and other power supply lanes.

The present disclosure was made in view of the above, and it is an object of the present disclosure to provide a power supply control device that can stabilize the overall power balance in a power supply system.

A power supply control device according to the present disclosure is a power supply control device for controlling a power supply lane that is provided on a road and supplies electric power to a vehicle.

The power supply control device includes a processor configured to when a power shortage occurs in a power supply area of the power supply lane, acquire travel state information of vehicles in a plurality of the power supply lanes managed by the power supply control device, and set a priority level for power supply to each of the power supply lanes based on the travel state information.

According to the present disclosure, it is possible to stabilize the overall power balance in a power supply system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A power supply control device according to an embodiment of the present disclosure will be described with reference to the drawings. Incidentally, the constituent elements in the following embodiments include those that can be easily replaced by a person skilled in the art or those that are substantially the same.

EMBODIMENTS

A Wireless Power Transfer System in which the power supply control device according to the embodiment is applied will be described referring to FIGS. 1 to 3.

Figure 1:
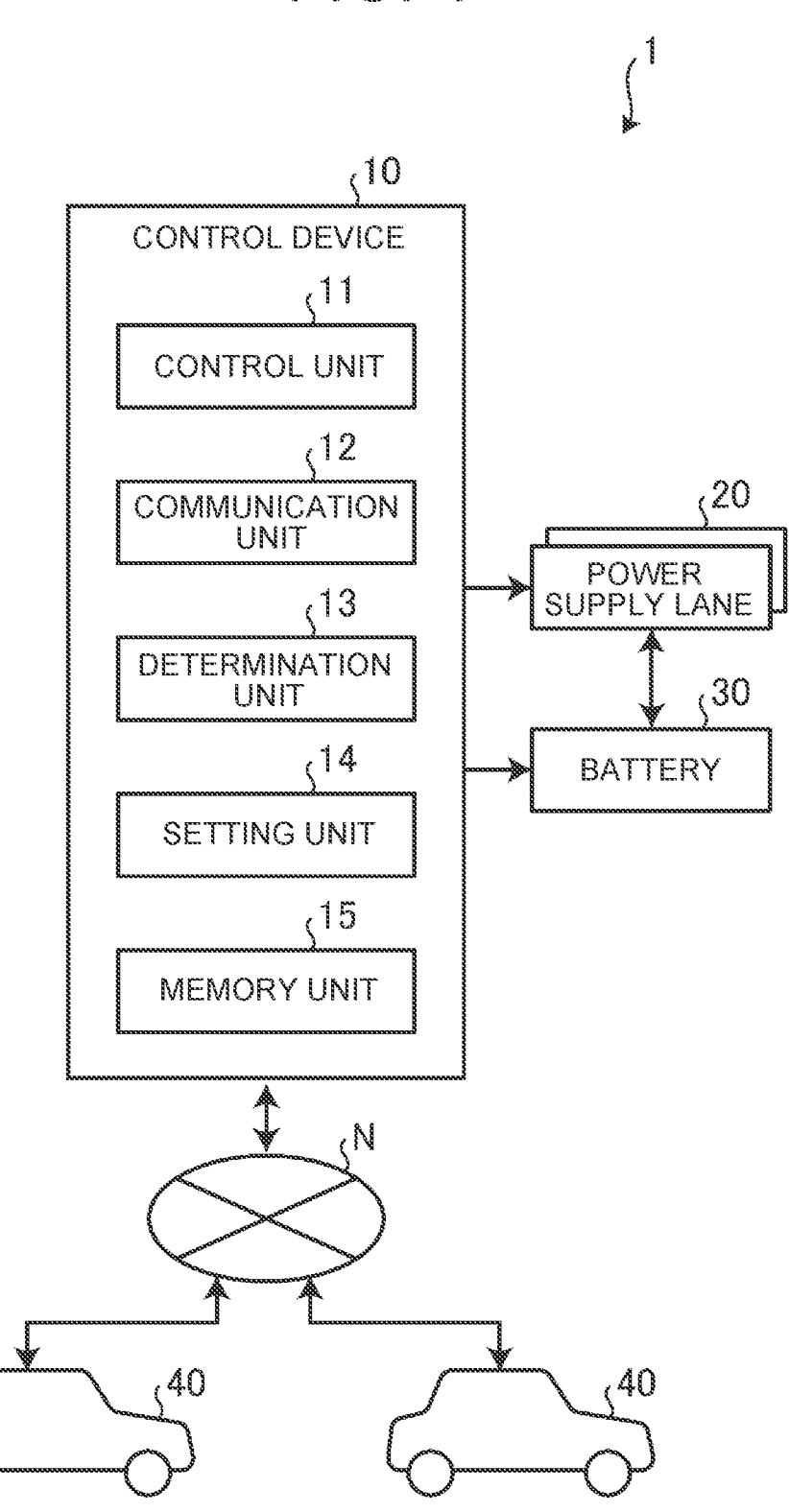
FIG. 1 is a schematic diagram illustrating a wireless power transfer system including a power supply control device according to an embodiment.

FIG. 1 is a schematic diagram illustrating a wireless power transfer system including a power supply control device according to an embodiment. The wireless power transfer system 1 performs wireless power transmission from the power supply lane 20 to the vehicle 40 by, for example, magnetic field resonance coupling (magnetic field resonance). The wireless power transfer system 1 includes a control device 10, a power supply lane 20, a battery 30, and a vehicle 40. The vehicles 40 are, for example, electrified vehicle capable of charging electric power supplied from an external power source, and are, for example, battery electric vehicle (BEV), plug-in hybrid electric vehicle (PHEV), and the like. The vehicle 40 may be a manual driving vehicle or an automatic driving vehicle. In addition, the vehicles 40 include a communication unit (for example, a Data Communication Module (DCM)) for communicating with the control device 10.

The wireless power transfer system 1 performs wireless power transmission from the power supply lane 20 to the vehicle 40 by magnetic field resonance coupling (magnetic field resonance).

The wireless power transfer system 1 transmits power to a vehicle 40 traveling on a power supply lane 20 disposed on a road in a non-contact manner. That is, the wireless power transfer system 1 transmits power by a magnetic field resonance method, and realizes power supply during traveling to the vehicle 40 by using magnetic field resonance coupling (magnetic field resonance). The wireless power transfer system 1 can be represented as a dynamic wireless power transfer (D-WPT) system or a magnetic field dynamic wireless power transfer (MF-D-WPT) system.

The control device 10 and the vehicle 40 each have a communication function and are configured to be able to communicate with each other through the network N. The network N includes, for example, an Internet network, a mobile telephone network, a Wireless Fidelity (WiFi (registered trademark)), a Bluetooth (registered trademark) Low Energy (BLE), and the like.

The control device 10 is a power supply control device that exchanges various kinds of information with the vehicle 40 and controls the power supply lane 20 and the battery 30. The control device 10 includes a control unit 11, a communication unit 12, and a storage unit 15.

Specifically, the control unit 11 includes a processor including Central Processing Unit (CPU), Digital Signal Processor (DSP), Field-Programmable Gate Array (FPGA), Graphics Processing Unit (GPU), and the like, and a memory (main storage unit) including Random Access Memory (RAM), Read Only Memory (ROM), and the like.

The control unit 11 loads a program stored in the storage unit 15 into a work area of the main storage unit and executes the program, and controls each component and the like through execution of the program, thereby realizing a function that matches a predetermined purpose.

The communication unit 12 includes, for example, a communication module capable of transmitting and receiving various types of information. The communication unit 12 communicates with the vehicle 40 through, for example, the network N to transmit and receive various types of information when power is supplied from the power supply lane 20 to the vehicle 40 or when the power supply lane 20 is supplied with power from the vehicle 40.

The determination unit 13 acquires congestion information of the vehicles 40 for each power supply lane 20, and determines whether to set the priority level for power supply to each power supply lane 20.

When the determination unit 13 determines that the priority level needs to be set for the power supply lane 20, the setting unit 14 sets the priority level to the power supply lane 20.

The storage unit 15 includes, for example, Erasable Programmable ROM (EPROM), Hard Disk Drive (HDD), and a recording medium such as a removable medium. Examples of the removable medium include disc recording media such as Universal Serial Bus (USB) memories, Compact Disc (CD), Digital Versatile Disc (DVD), Blu-ray (registered trademark) Disc (BD). The storage unit 15 can store Operating System (OS), various programs, various tables, various databases, and the like.

The storage unit 15 stores, for example, various types of information exchanged with the vehicle 40, information on the remaining capacity of the battery 30, and the like.

Figure 2:
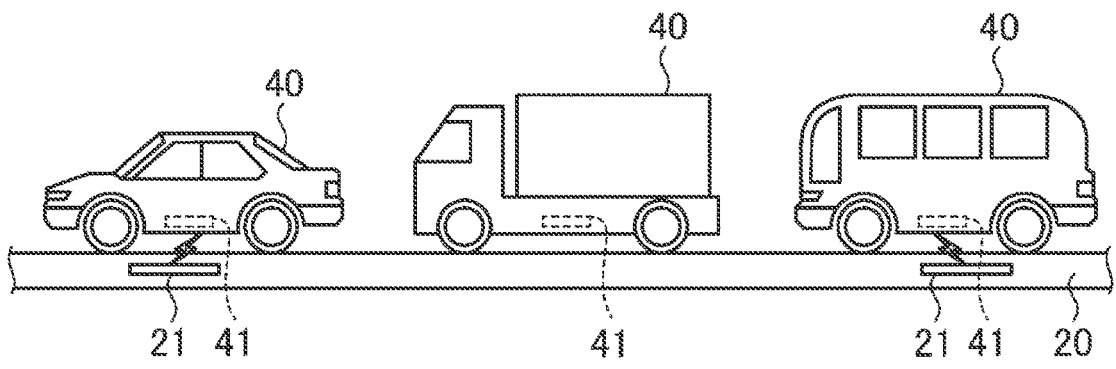
FIG. 2 is a diagram for explaining a power supply lane.
Figure 3:
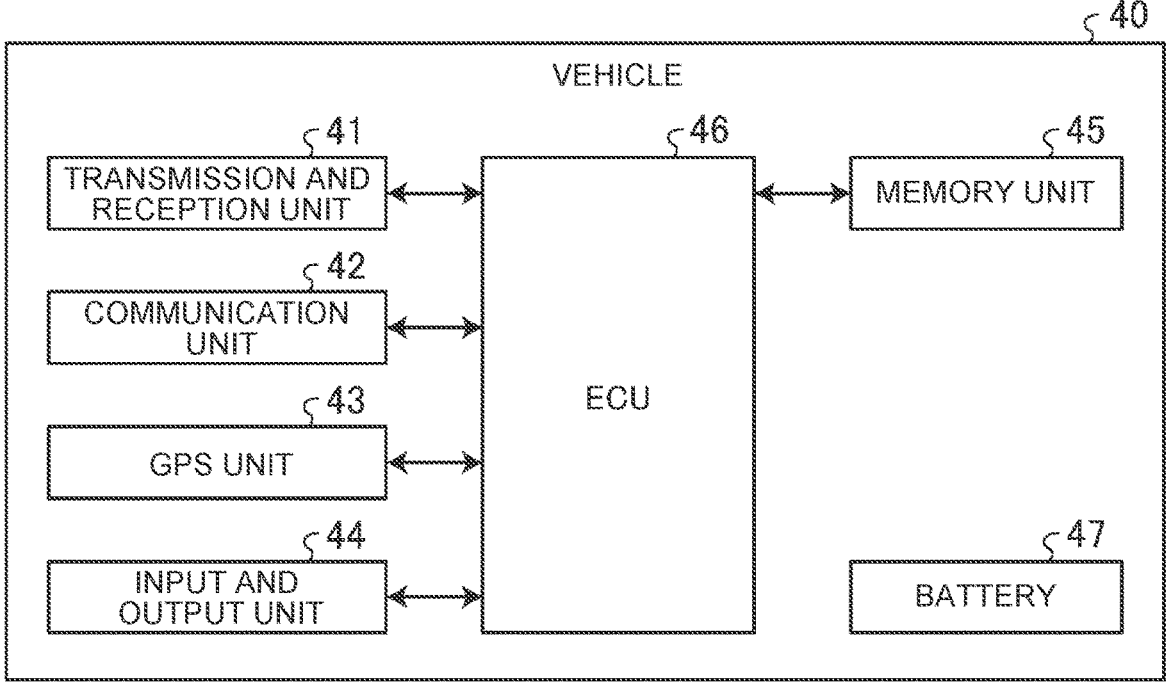
FIG. 3 is a block diagram for explaining a functional configuration of a vehicle according to the embodiment.

FIG. 2 is a diagram for explaining a power supply lane. In the present embodiment, as shown in FIG. 2, the shape of the vehicle and the like may be different as long as they have a common function.

The power supply lane 20 is configured to be able to supply electric power to the vehicle 40 in a non-contact manner. Specifically, the power supply lane 20 includes an energization unit 21 including a coil that supplies electric power to the vehicle 40. The current-carrying portion 21 is embedded in a lane of a road.

The battery 30 is a stationary power storage device. When the power supply lane 20 functions as a power transmission lane, the battery 30 supplies power to the power supply lane 20. When the power supply lane 20 functions as a power reception lane, the battery 30 receives electric power from the power supply lane 20 and stores the electric power. Further, the battery 30 may be supplied with electric power from an external power generation facility, or may be supplied with electric power to an external consumer facility. Although only one battery 30 is illustrated in FIG. 1, the battery 30 may be provided for each power supply lane 20.

Next, the configuration of the vehicle 40 will be described with reference to FIGS. 1 and 3. FIG. 3 is a block diagram for explaining a functional configuration of the vehicle according to the embodiment.

In the vehicle 40, the battery 47 is charged by electric power supplied from the energization unit 21 managed by the control device 10.

The vehicle 40 includes a transmission/reception unit 41, a communication unit 42, a Global Positioning System (GPS) unit 43, an input/output unit 44, a storage unit 45, and an Electronic Control Unit (ECU) 46. Further, the vehicle 40 is provided with a battery 47 that supplies electric power to each unit. The battery 47 is a power storage device and is configured to be chargeable. The components for controlling the vehicles 40 are configured by using one or a plurality of computers including a CPU, FPGA, ROM, a RAM, and the like.

The transmission/reception unit 41 functions as a reception unit that receives a power supply signal from the energization unit 21. In addition, the transmission/reception unit 41 functions as a transmission unit that transmits a power supply signal to the energization unit 21.

The communication unit 42 performs communication with each external device by wireless communication via the network N. The communication unit 42 receives, from an external device, road traffic information such as regulations and traffic congestion, and information related to a disaster.

GPS unit 43 receives radio waves from GPS satellites and detects the position of the vehicles 40. The detected position is output to the outside as position information of the vehicle 40 or stored in the storage unit.

The input/output unit 44 includes a touch panel display, a speaker, a microphone, and the like. The input/output unit 44 is configured to be capable of outputting information, such as displaying characters, figures, and the like on a screen of a touch panel display, outputting sound from a speaker, and the like, under the control of ECU 46. In addition, the input/output unit 44 is configured to allow a user of the vehicle 40 or the like to operate the touch panel display or to emit sound toward the microphone, thereby inputting predetermined data to ECU 46.

The storage unit 45 is configured by using a computer-readable recording medium, and stores various programs and various data in a writable and readable manner. The recording medium includes a storage medium such as a hard disk, a semiconductor memory, an optical disk, a flash memory, and a magnetic disk, and a drive device of the storage medium. The storage unit 45 stores an operating system (OS) and programs of various applications required for ECU 46 to comprehensively control the operations of the respective units of the vehicles 40.

ECU 46 includes an information processing device such as a microcomputer including a CPU, FPGA, ROM, a RAM, and the like. ECU 46 comprehensively controls the electric operations of the respective units of the vehicles 40. ECU 46 is configured to perform an operation using inputted data, data stored in advance, and a program, and output the operation result as a control command signal.

The vehicle 40 includes a drive mechanism and an operation mechanism for driving the vehicle 40. Specifically, the vehicle 40 includes a powertrain and drive wheels as drive mechanisms. The powertrain includes a power source that generates a driving force and outputs the driving force from an output shaft, and a power transmission mechanism that transmits the driving force output from the power source to the driving wheels 2. The operation mechanism includes a shift lever, an accelerator pedal, and the like. When autonomous driving of the vehicles 40 is performed, the respective units are driven in accordance with an instruction under the control of ECU 46.

Figure 4:
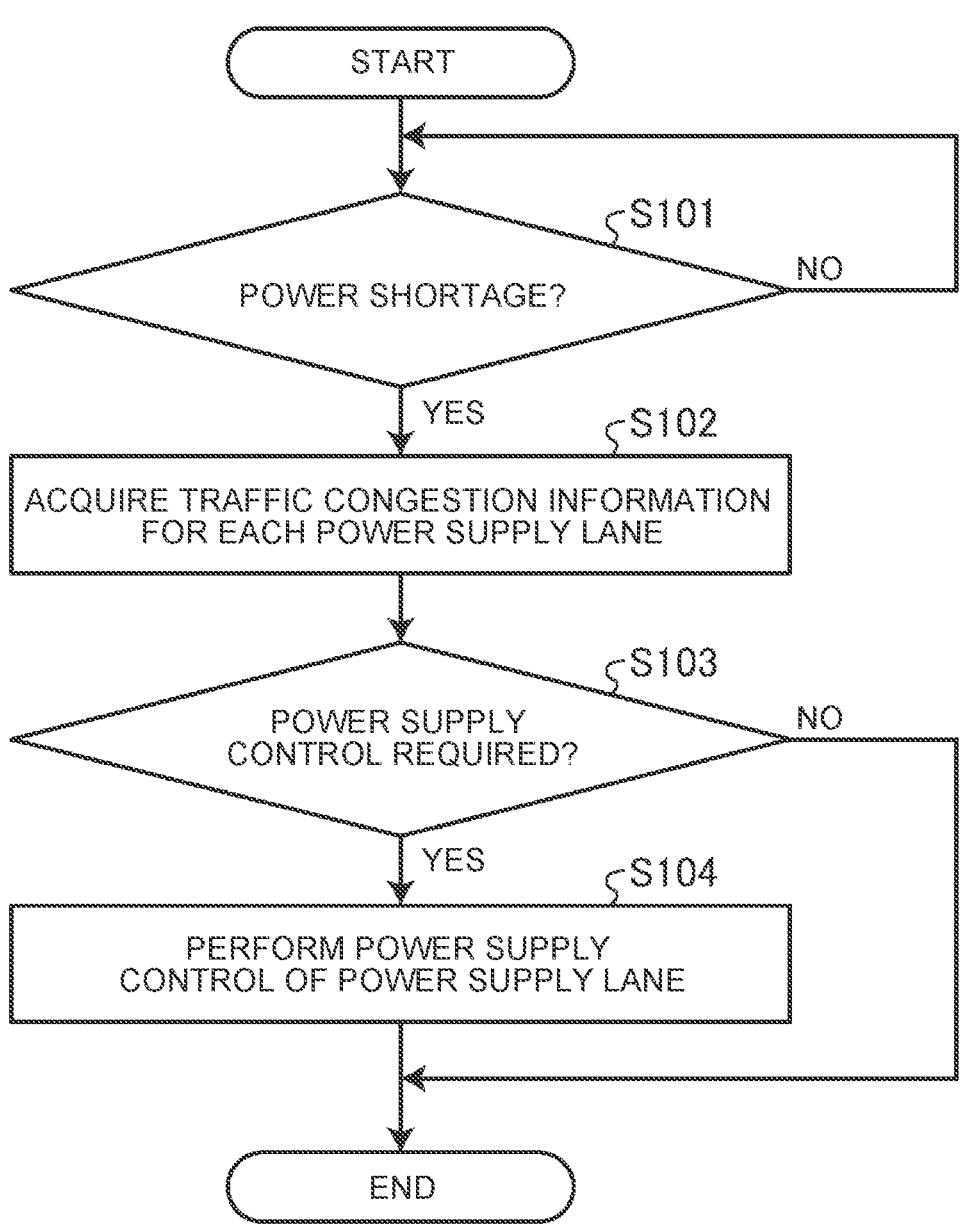
FIG. 4 is a flow chart showing the flow of control of the power supply lanes.

Here, in the present embodiment, the power to be transmitted between the vehicle 40 and the power supply lane 20 is controlled based on the travel state of the vehicle in the power supply lane 20. This power supply control will be described with reference to FIG. 4. FIG. 4 is a flowchart illustrating a flow of control of a power supply lane.

First, in this power supply control, the control unit 11 determines whether or not a power shortage has occurred or is predicted to occur in the near future under the control of the wireless power transfer system 1 (power supply area by the power supply lane 20) (S101). The control unit 11 acquires, for example, information related to electric power from the outside and determines whether or not there is a shortage of electric power. When determining that the power shortage has not occurred (S101: No), the control unit 11 repeats the determination of whether or not the power shortage has occurred. On the other hand, if ECU 46 determines that a power shortage has occurred or is expected to occur (S101: Yes), it transitions to S102.

In S102, the control unit 11 acquires travel state information of the vehicles 40 for each of the power supply lanes 20. The travel state information includes, for example, information corresponding to the number of the traveling vehicles 40, the speed of the traveling vehicles 40, or the average value of the speeds, for each of the power supply lanes 20.

After acquiring the travel state information, the control unit 11 causes the determination unit 13 to determine whether or not power supply control is necessary (S103). In this step, the determination unit 13 determines whether or not power supply control is necessary in accordance with the situation of the vehicle 40 traveling on the power supply lane 20. Here, the determination unit 13 determines whether or not the power supply lane 20 is congested on the basis of the number of vehicles with respect to the length of the power supply lane 20, the distance (inter-vehicle) between the vehicles 40, the average value of the distances, and the like, and determines that power supply control is required when it is determined that the power supply lane is congested.

When the determination unit 13 determines that the power supply control is not required (S103: No), the control unit 11 ends the process. On the other hand, when the determination unit 13 determines that power supply control is required (S103: Yes), the control unit 11 proceeds to S104.

In S104, the control unit 11 executes power supply control of the power supply lane 20. Specifically, the control unit 11 controls the power supplied to each power supply lane 20 based on the priority level set by the setting unit 14. The setting unit 14 sets the priority level for power supply to the power supply lane 20 according to the travel state of the vehicle 40 in the power supply lane 20. In the present embodiment, the setting unit 14 sets the priority level based on, for example, the number of vehicles 40 in the power supply lane 20 and the average vehicle speed of the vehicles 40 for each power supply lane 20. Specifically, since it is estimated that the power consumption of the low-speed vehicle 40 is small and the necessity of power supply is low, the setting unit 14 sets the priority level for power supply to the power supply lane 20, which is estimated to be congested, in which the number of the vehicles 40 is large and the average vehicle speed is low. The setting unit 14, for example, the product of the reciprocal number of the vehicle 40 and the average speed as the traffic congestion index, and the power supply lane 20 having a small traffic congestion index, sets the priority level to low.

Figure 5:
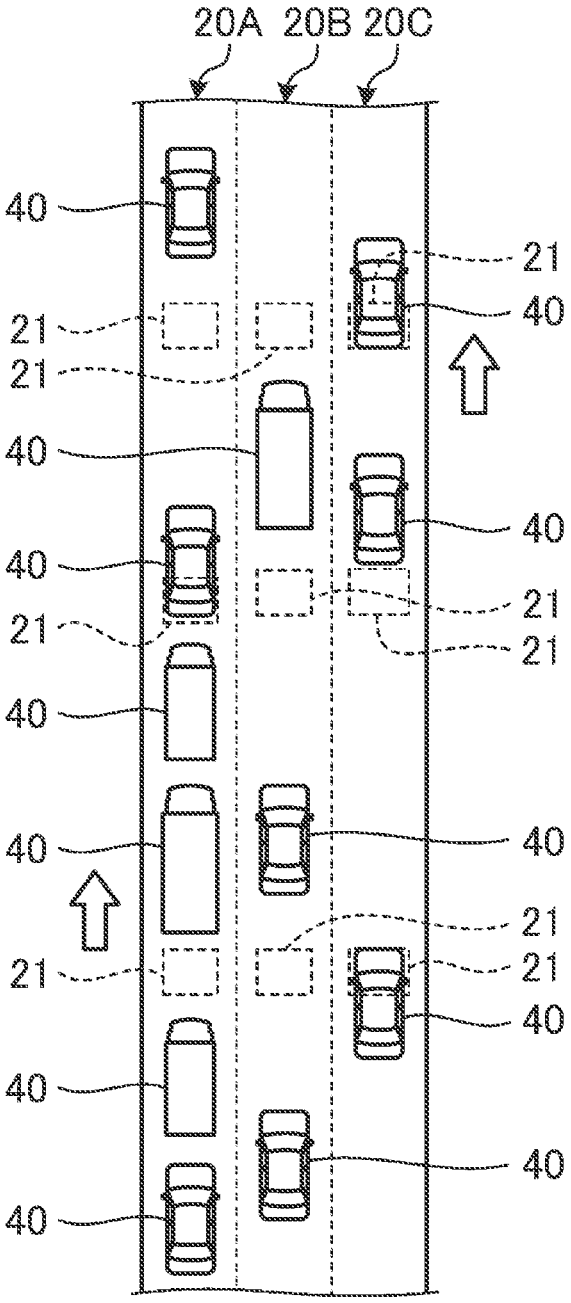
FIG. 5 is a diagram for explaining power control.

FIG. 5 is a diagram illustrating power control. As shown in FIG. 5, three power supply lanes 20A to 20C will be described. The power supply lanes 20A to 20C extend in the same direction, and the traveling direction of the vehicles 40 traveling in the lane is the same. The setting unit 14 acquires the numbers of vehicles 40 in the power supply lanes 20A to 20C and the averaged speeds of the plurality of vehicles 40 traveling in the same lane. For example, the setting unit 14 sets the priority level for each of the power supply lanes 20A to 20C based on the calculated traffic congestion index. For example, the setting unit 14 sets the priority levels in order of the power supply lane 20A, the power supply lane 20B, and the power supply lane 20C, with the power supply lane 20A the lowest (20A<20B<20C). Note that the priority level may be set to zero, and power supply may not be performed.

The control unit 11 executes power supply control based on the priority level set by the setting unit 14. For example, in the embodiment illustrated in FIG. 5, power supply control is performed such that the power supplied to the power supply lane 20C is the largest and the power supplied to the power supply lane 20A is the smallest. By this power supply control, power supply corresponding to the power consumption of the vehicle 40 traveling in the lane can be executed.

In the present embodiment described above, in the case where a power shortage occurs, the priority level for power supply is set to the power supply lane with reference to the travel state information, and the power corresponding to the power consumption of the vehicle 40 traveling on the lane is supplied, so that the balance of the amount of power to be supplied to the vehicle 40 traveling on each of the power supply lanes 20 in the range controlled by the system is adjusted. According to the present embodiment, the power to be supplied is leveled by the balance adjustment of the power supply to the power supply lanes, and the power balance in the entire wireless power transfer system 1 can be stabilized.

In the embodiment, for example, the power supply lane on which the emergency vehicle travels may not be subject to the priority level setting, or the priority level may be set to the highest.

Further advantages and variations can be readily derived by one of ordinary skill in the art. Thus, the broader aspects of the disclosure are not limited to the specific details and representative embodiments presented and described above. Accordingly, various modifications may be made without departing from the spirit or scope of the general inventive concept as defined by the appended claims and their equivalents.

What is claimed is:

1. A power supply control device for controlling a power supply lane that is provided on a road and supplies electric power to a vehicle, the power supply control device comprising a processor, the processor being configured to:

when a power shortage occurs in a power supply area of the power supply lane, acquire travel state information including, for each of a plurality of the power supply lanes managed by the power supply control device, a number of vehicles traveling on the power supply lane and an average speed of the vehicles traveling on the power supply lane;

for each of the plurality of the power supply lanes, calculate a congestion index by multiplying a reciprocal of the number of vehicles traveling on the power supply lane by the average speed of the vehicles traveling on the power supply lane;

set a priority level for power supply to each of the power supply lanes based on the respective congestion index; and control the power supply to each of the plurality of power supply lanes based on the respective priority level.

2. The power supply control device according to claim 1, wherein the processor is configured to set the priority level lower for a power supply lane with a smaller traffic congestion index.

3. The power supply control device according to claim 1, wherein the processor is configured to not perform the power supply to a power supply lane with a zero priority level.

\*    \*    \*    \*    \*